Patented July 19, 1932

1,868,137

UNITED STATES PATENT OFFICE

HENRY CHRISTIAN LOUIS DUNKER, OF HELSINGBORG, SWEDEN

PRESSING UP OF RUBBER FOOTWEAR, GALOSHES, OR THE LIKE

No Drawing. Application filed August 22, 1929, Serial No. 387,783, and in Germany March 19, 1928.

In the manufacture of rubber foot-wear, e. g. sea-side shoes or galoshes, with the use of a press, it is usual to employ heated outer side moulds and one or more heated sole moulds which are assembled during the pressing process around a last, which has been previously covered with the necessary layers of fabric and rubber. The last is covered with the fabric and rubber outside the press and is again removed therefrom when the foot-wear has been pressed and is to be removed from the last. The pressure from the outer moulds (side and sole moulds) assembled around the last brings the rubber layers placed around the last into a fluent state, so that the rubber fills the cavities of the moulds and forms an integral mass with the fabric layers which are placed directly on the last and which fabric forms the lining of the foot-wear or galosh. Prior to my invention I covered the fabric layers from which the lining is made with the rubber on the rear side, so that outer rubber cover placed around the last will easily flow together with the inner covering placed immediately on the last and unite itself therewith, the inner covering constituting the lining of the completed article of foot-wear. Even when a last is covered manually layer for layer with a lining and rubber impregnated linen and with an outer rubber layer it may be difficult to prevent the formation of folds or wrinkles in the lining or the intermediate layers successively as the outer layers are rolled thereupon, and to remove this deficiency it has been proposed to pre-vulcanize the lining and the inner sole in order to give the inner parts of the foot-wear a better cohesion so that the outer layers can be rolled on without causing folds to rise in the lining. My invention relates to a method of molding or pressing foot-wear, as e. g. sea-side shoes, galoshes and the like in a press, the outer moulds of which form the rubber portion of the foot-wear in one operation, and the invention aims particularly to prevent displacement of the lining and the formation of folds therein by making an integral lining portion or inner shoe made outside the press and put on to the press last, on which it is covered with the outer rubber layers which are to be pressed in the press and shaped to form the rubber portion proper of the footwear. The inner shoe or lining portion which is preferably made on a special last usually consists of rubber impregnated materials cut to suitable shape and stitched or sewn together to form a lining portion or inner shoe corresponding to the form of the final article of foot-wear. The said inner shoe or lining portion need not consist of the impregnated lining in combination with the inner sole only, but may be reinforced e. g. around the heel, by a rubber layer. When the inner shoe is made as above described in the shape of a shoe or boot, it is subjected to a preliminary vulcanization, which may be more or less complete, but which must in any event be sufficient to make the inner shoe sufficiently stiff and coherent to allow it to be drawn on to the press last and resist the pressure from the outer rubber cover during the pressing process in the press without the lining portion creasing or the adhesion of the individual layers or parts of the lining portion being broken. As it is important that the lining portion be not subject to greater displacements than necessary, a considerable number of side moulds are normally employed in pressing machines constructed to work with a pre-vulcanized lining portion such as that described above, so that each individual side mould may be moved approximately perpendicularly inwards toward that part of the outer rubber cover against which the particular side mould is to act. The inner shoe or lining portion described above may in certain cases consist partly of linen or the like materials. This applies particularly to foot-wear consisting partially of linen, where only the lower part of the foot-wear is rubber-covered. The pre-vulcanization acts in this case only to reinforce those parts of the shoe formed by the inner sole in combination with the lining proper and the stiffener, if the lining has such stiffener. The prevulcanization of the lining portion or inner shoe prevents also the outer rubber layers from penetrating into the lining and damaging it during the pressing process.

I claim:
1. The herein described method of producing pressed rubber footwear, comprising a rubber sole and at least partially rubber covered sides, which method consists in forming a coherent inner lining portion comprising a sole and sides of at least partially rubber covered fabric, subjecting said lining portion to a preliminary vulcanization to prevent change of shape and folding thereof when said lining is subjected to pressure during the pressing process, drawing said preliminarily vulcanized lining portion over a press last, applying pieces of roughly cut rubber to the exterior of said lining portion and applying heated molding pressure to the assembly to form the final article.

2. The herein described method of producing pressed rubber footwear, comprising the steps claimed in claim 1 and the additional step of applying a reinforcement of rubber-impregnated fabric about the heel portion of the inner lining portion prior to the preliminary vulcanization of the latter.

In testimony whereof I affix my signature.

HENRY CHRISTIAN LOUIS DUNKER.